(12) United States Patent
Gascoyne et al.

(10) Patent No.: US 7,405,021 B2
(45) Date of Patent: Jul. 29, 2008

(54) WATER-RETAINING ANODE STRUCTURE FOR A FUEL CELL

(75) Inventors: John Malcolm Gascoyne, Bucks (GB); Graham Alan Hards, Reading (GB); Thomas Robertson Ralph, Reading (GB)

(73) Assignee: Johnson Matthey Public Limited Company, London (GB)

( * ) Notice: Subject to any disclaimer, the term of this patent is extended or adjusted under 35 U.S.C. 154(b) by 626 days.

(21) Appl. No.: 10/332,438

(22) PCT Filed: Jun. 20, 2001

(86) PCT No.: PCT/GB01/02755

§ 371 (c)(1),
(2), (4) Date: Aug. 18, 2003

(87) PCT Pub. No.: WO02/05365

PCT Pub. Date: Jan. 17, 2002

(65) Prior Publication Data

US 2004/0076871 A1 Apr. 22, 2004

(30) Foreign Application Priority Data

Jul. 8, 2000 (GB) ................. 0016752.8

(51) Int. Cl.
*H01M 4/02* (2006.01)
(52) U.S. Cl. .......................... 429/42; 429/44
(58) Field of Classification Search ............. 429/40–42, 429/44
See application file for complete search history.

(56) References Cited

U.S. PATENT DOCUMENTS

| | | | |
|---|---|---|---|
| 3,282,875 A | 11/1966 | Connolly et al. | |
| 4,329,435 A | 5/1982 | Kimoto et al. | |
| 4,330,654 A | 5/1982 | Ezzell et al. | |
| 4,358,545 A | 11/1982 | Ezzell et al. | |
| 4,417,969 A | 11/1983 | Ezzell et al. | |
| 4,433,082 A | 2/1984 | Grot | |
| 4,610,762 A | 9/1986 | Birdwell | |
| 4,940,525 A | 7/1990 | Ezzell et al. | |
| 4,956,131 A * | 9/1990 | Shigeta et al. | 264/29.5 |
| 5,094,995 A | 3/1992 | Butt et al. | |
| 5,438,082 A | 8/1995 | Helmer-Metzmann et al. | |
| 5,468,574 A | 11/1995 | Ehrenberg et al. | |
| 5,521,020 A | 5/1996 | Dhar | |
| 5,523,181 A | 6/1996 | Stonehart et al. | |
| 5,595,676 A | 1/1997 | Barnes et al. | |
| 5,599,639 A | 2/1997 | Sansone et al. | |
| 5,635,039 A | 6/1997 | Cisar et al. | |
| 5,753,088 A * | 5/1998 | Olk | 204/173 |
| 5,766,787 A | 6/1998 | Watanabe et al. | |
| 6,696,382 B1 * | 2/2004 | Zelenay et al. | 502/168 |
| 2002/0061433 A1 * | 5/2002 | Kawamura et al. | 429/40 |

FOREIGN PATENT DOCUMENTS

| | | |
|---|---|---|
| EP | 0 292 184 | 11/1988 |
| EP | 0 345 964 | 12/1989 |
| EP | 0 574 791 | 12/1993 |
| EP | 0 654 837 | 5/1995 |
| EP | 0 731 520 | 9/1996 |
| EP | 0 791 974 | 8/1997 |
| EP | 0 331 321 | 9/1998 |
| WO | WO 94/16002 | 7/1994 |
| WO | WO 94/25993 | 11/1994 |
| WO | WO 95/08581 | 3/1995 |
| WO | WO 96/29752 | 9/1996 |
| WO | WO 97/25369 | 7/1997 |
| WO | WO 00/44055 | 7/2000 |
| WO | WO 00/45448 | 8/2000 |
| WO | WO 01/15249 | 3/2001 |

OTHER PUBLICATIONS

Che, Guangli; Brinda d. Lakshmi; Charles R. Martin; and Ellen R. Fisher Metal-Nanocluster-Filled Carbon Nanotubes: Catalytic Properties and Possible Applications in Electrochemical Energy Storage and Production. Langmuir, 15, 750-758. Jan. 5, 1999.*
Watanabe et al., "Management of the Water Content in Polymer Electrolyte Membranes with Porous Fiber Wicks," *J. Electrochem. Soc.*, vol. 140, No. 11, Nov. 1993, pp. 3190-3193.
International Search Report dated Oct. 9, 2001, from International Application No. PCT/GB01/02755.
British Search Report dated Nov. 21, 2000, from UK Application No. 0016752.8.

* cited by examiner

*Primary Examiner*—Susy Tsang-Foster
*Assistant Examiner*—Alix Echelmeyer
(74) *Attorney, Agent, or Firm*—RatnerPrestia

(57) ABSTRACT

A novel anode structure for making a proton exchange membrane fuel cell (PEMFC) tolerant to incidences of cell reversal includes an electrocatalyst layer having at least one electrocatalyst and at least one proton conducting polymer. The anode structure also includes one or more water retaining material(s), such as carbon nanofibers, embedded within the electrocatalyst layer.

9 Claims, No Drawings

WATER-RETAINING ANODE STRUCTURE FOR A FUEL CELL

The present invention relates to a novel anode structure comprising an electrocatalyst layer which comprises a water retaining material, e.g. fibres, fibrils and/or particles, such that the water distribution and transport within the layer is improved and the water transport from the directly adjacent layers is enhanced. When such an anode structure is used in a fuel cell, the cell attains a tolerance to incidences of cell reversal. The invention also relates to an electrocatalyst ink suitable for use in the preparation of the anode structure.

A fuel cell is an energy conversion device that efficiently converts chemical energy into electrical energy by electrochemically combining either hydrogen, stored as a gas, or methanol stored as a liquid or gas, with oxygen, normally in the form of air, to generate electrical power. At their fundamental level fuel cells comprise electrochemical cells formed from a solid or liquid electrolyte and two electrodes, the anode side and cathode side, at which the desired electrochemical reactions take place. In the fuel cell the hydrogen or methanol is oxidised at the anode side and the oxygen is reduced at the cathode side to generate the electrical power. Normally in fuel cells the reactants are in gaseous form and have to be diffused into the anode and cathode structures. The electrode structures are therefore specifically designed to be porous to gas diffusion in order to optimise the contact between the reactants and the reaction sites in the electrode to maximise the reaction rate. Efficient removal of the reaction products from the electrode structures is also important. In cases where liquid reactants and products are present the electrode structures often have to be tailored to efficiently feed reactants to and remove products from the reaction sites. The electrolyte also has to be in contact with both electrodes and in fuel cell devices may be acidic or alkaline, liquid or solid in nature. The proton exchange membrane fuel cell (PEMFC), however, is the most likely type of fuel cell to find wide application as an efficient and low emission power generation technology for a range of markets, such as stationary, residential and portable power generation, and as an alternative to the internal combustion engine for transportation. In the PEMFC, whether hydrogen or methanol fuelled, the electrolyte is a solid proton-conducting polymer membrane, commonly based on perfluorosulphonic acid materials.

In the PEMFC the combined laminate structure formed from the membrane and the two electrode structures is known as a membrane electrode assembly (MEA). The MEA typically comprises several layers, but in general can be considered to comprise five layers that are dictated by their function. On either side of the membrane an anode and cathode electrocatalyst layer is incorporated to increase the rates of the desired electrode reactions. In contact with the electrocatalyst containing layers, on the opposite face to that in contact with the membrane, are the anode and cathode gas diffusion substrate layers. The anode gas diffusion substrate is designed to be porous. This allows the reactant hydrogen or methanol to enter from the face of the substrate exposed to the reactant fuel supply and diffuse through the thickness of the substrate to the layer containing the electrocatalyst, which is usually platinum metal based, to maximise the electrochemical oxidation of hydrogen or methanol. The anode electrocatalyst layer is also designed to comprise some level of proton conducting electrolyte in contact with the same electrocatalyst reaction sites. With acidic electrolyte types the product of the anode reaction is protons and these can then be efficiently transported from the anode reaction sites through the electrolyte to the cathode layers. The cathode substrate is also designed to be porous and to allow oxygen or air to enter the substrate and diffuse through to the electrocatalyst layer reaction sites. The cathode electrocatalyst combines the protons with oxygen to produce water and is also designed to comprise some level of the proton conducting electrolyte in contact with the said electrocatalyst reaction sites. Product water must also be able to diffuse out of the cathode structure. The structure of the cathode has to be designed such that it enables the efficient removal of the product water. If excess water builds up in the cathode it becomes more difficult for the reactant oxygen to diffuse to the reactant sites, and thus the performance of the fuel cell decreases. In the case of methanol fuelled PEMFCs, additional water is present due to the water contained in the methanol, which can be transported through the membrane from the anode to the cathode side. The increased quantity of water at the cathode requires removal. However it is also the case with proton conducting membrane electrolytes, that if too much water is removed from the cathode structure, the membrane can dry out resulting in a significant decrease in the performance of the fuel cell.

The complete MEA can be constructed by several methods. The electrocatalyst layers can be bonded to one surface of the gas diffusion substrate to form what is known as a catalyst coated gas diffusion substrate. Two catalysed gas diffusion substrates can be combined with the solid proton-conducting membrane to form the MEA. Alternatively, two porous gas diffusion substrates can be combined with a solid proton-conducting polymer membrane that is catalysed on both sides (a catalyst coated membrane) to form the MEA. Further, one catalysed gas diffusion substrate can be combined with one gas diffusion substrate and a solid proton-conducting polymer membrane that is catalysed on the side facing the gas diffusion substrate to form the MEA.

The materials typically used in the fabrication of the gas diffusion substrate layers of the MEA comprise gas porous electron conducting materials such as rigid carbon fibre paper (e.g. Toray TGP-H-60 or TGP-H-90 from Toray Industries, Japan) or woven carbon cloths, such as Zoltek PWB-3 (Zoltek Corporation, 3101 McKelvey Road, St. Louis, Mo. 63044, USA). Substrates such as these are usually modified with a particulate material either embedded within the fibre network or coated on to the large planar surfaces, or a combination of both. Typically these particulate materials comprise a carbon black and polymer mix. The particulate carbon black material is, for example, an oil furnace black such as Vulcan XC72R (from Cabot Chemicals, Billerica, Mass., USA) or an acetylene black such as Shawinigan (from Chevron Chemicals, Houston, Tex., USA). The polymer most frequently used is polytetrafluoroethylene (PTFE). The coating, or embedding, is carried out in order to improve the water management properties, improve gas diffusion characteristics, to provide a continuous surface on which to apply the catalyst layer and to improve the electrical conductivity. More recently, electrode structures based on gas diffusion substrates comprising a non-woven network of carbon fibres (carbon fibre structures such as Optimat 203, from Technical Fibre Products, Kendal, Cumbria, UK) with a particulate material embedded within the fibre network as disclosed in EP 0 791 974 have shown comparable performances to structures based on carbon fibre paper or cloth.

The electrocatalyst materials for the anode and cathode structures typically comprise precious metals, in particular platinum, as these have been found to be the most efficient and stable electrocatalysts for all low-temperature fuel cells such as the PEMFC. Platinum is employed either on its own as the only electrocatalytic metal or in combination with other precious metals or base metals. The platinum based electrocatalyst is provided as very small particles (~20-50 Å) of high surface area, which are usually distributed on and supported by larger macroscopic conducting carbon particles to provide a desired catalyst loading. Conducting carbons are the preferred materials to support the catalyst. Particulate carbon black materials typically employed include Vulcan XC72R and Shawinigan. It is also possible that the platinum based electrocatalyst may not incorporate a support, and in this case it is referred to as an unsupported Pt electrocatalyst.

Each MEA in the PEMFC is sandwiched between electrically conducting flow field plates which are conventionally based on carbon and contain channels that feed the MEA with the reactants and through which the products are removed. Since each MEA typically delivers 0.6-0.7V, usually between 10 to 300 such MEAs are located between flow field plates to form stacks. These stacks are combined electrically in series or parallel to give the desired power output for a given application.

Recently it has been reported that during prolonged operation some cells in large stacks can go into an undesired condition known as cell reversal. This condition is characterised by the cell potential becoming negative rather than the positive value associated with normal PEMFC operation. Such cell reversals can be due to depletion in the concentration of the reactants at the cathode or anode sides, which can be caused by a number of factors such as restricted gas flow due to blocked flow fields or poor water distribution within the MEA structure. Allied to this in situations where a fast dynamic response is required, such as in transportation applications, it is possible that the gas flow cannot respond quickly enough to sustain the current demand. Further, if one cell in a stack shows cell reversal it can result in adjacent cells in the stack also showing cell reversal since they are in electrical contact.

If the cell reversal is due to a restricted oxygen concentration at the electrocatalyst sites in the cathode then, to sustain the flow of current, hydrogen is produced at the cathode, $$2H^+ + 2e^- \rightarrow H_2$$

Since hydrogen production at the cathode is very facile at the platinum based electrocatalysts typically employed, the electrode potential is usually only slightly more negative than that for hydrogen oxidation at the anode. The result is that at normal operating current densities the cell voltage is normally slightly negative e.g. −0.1 V. This type of cell reversal does raise safety and durability concerns since hydrogen is being produced in the oxidant side of the cell, a significant quantity of heat is generated and water is no longer being produced at the cathode. Since the water produced normally at the cathode ensures electrocatalyst layer hydration and helps to sustain membrane hydration especially at the membrane-anode interface by promoting back-diffusion of water through the membrane, keeping the cathode electrocatalyst layer hydrated is important.

The major problem occurs, however, if the hydrogen concentration is restricted at the anode side. In this case to sustain the flow of current, water electrolysis and carbon corrosion can occur, $$2H_2O \rightarrow O_2 + 4H^+ + 4e^-$$

$$C + 2H_2O \rightarrow CO_2 + 4H^+ + 4e^-$$

Since both electrode reactions occur at more positive electrode potentials than oxygen reduction at the cathode, again, the cell voltage is negative, but in this case the cell voltage may be as high as −0.8 V at typical operating current densities. While carbon corrosion is favoured over water electrolysis thermodynamically, the electrochemical kinetics of water electrolysis are sufficiently facile at the platinum based electrocatalysts typically employed in the PEMFC, that initially water electrolysis principally sustains the current. There is only a small contribution from corrosion of the carbon components in the anode to the cell current. If, however, the anode catalyst becomes deactivated for water electrolysis or if the water concentration at the electrocatalyst sites in the anode becomes significantly depleted, the water electrolysis current is gradually replaced by increased rates of carbon corrosion. In the case of carbon corrosion water need only be present in the vicinity of the relevant, abundant carbon surfaces. During this period the cell voltage becomes more negative (i.e. the anode potential becomes more positive) to provide the necessary driving force for carbon corrosion. This in turn increases the driving force for the water electrolysis reaction. The result if cell reversal is prolonged may be irreversible damage to the membrane and catalyst layers due to excessive dehydration and local heating. Further, the catalyst carbon support in the anode structure corrodes, with eventual dissolution of the platinum based catalyst from the support and the anode gas diffusion substrate may become degraded due to corrosion of the carbon present in the substrate structure. In cases where the bipolar flow field plates are based on carbon the anode flow field plate may also be subjected to significant carbon corrosion, resulting in surface pitting and damage to the flow field pattern.

The major causes of irreversible cell damage that can occur under cell reversal conditions at the anode can be ameliorated if water electrolysis can be sustained by maintaining a sufficiently high water concentration within the MEA. More particularly it is important to ensure that a sufficient level of water can be maintained close to the electrocatalyst reaction sites where the electrolysis takes place. This can significantly delay the onset of corrosion of the carbon-based materials in the anode side of the MEA. The ability to sustain water electrolysis at the anode even for a short time can be critical in giving time for detecting the cell reversal and rectifying the problem. A number of approaches to maintaining a water supply or water buffer within an MEA structure have previously been proposed for a range of applications. These have involved such methods as incorporating wicks into the membrane structure (Watanabe et Al, J. Electrochem. Soc., vol. 140, No. 11, 1993) wherein the water is supplied from a source external to the cell itself. Passages have also been created in proton conducting membranes for use in electrochemical cells in order to allow direct fluid flow through the membrane for the purposes of hydration. Thus Cisar et al in U.S. Pat. No. 5,635,039 describe the formation of open, substantially unobstructed, parallel internal passages within a proton conducting membrane. Again these systems require an external source of water for them to function in the appropriate manner. Typically the location of the additional water supply is not directly adjacent to the electrolysis sites and thus the water has to diffuse from the reservoir location into the electrocatalyst layer to reach the electrolysis sites.

Therefore it would be a significant advantage if the structure of the anode electrocatalyst layer could be formed in such a way as to be able to facilitate the rapid transport of water within the structure in the x, y and z directions. Thus additional water to sustain the electrolysis reaction could be transported from other locations adjacent to the electrocatalyst layer directly to the sites where the electrolysis reaction is occurring thus assisting in protecting the MEA from the deleterious effects of cell reversal. This is the problem the present inventors have set out to address.

It is the aim of the present invention to provide a novel structure for an anode electrocatalyst layer in an MEA that has improved water retaining characteristics and improved water distribution and transport within the electrocatalyst layer. We have found that this can be achieved by the addition of water retaining materials to the electrocatalyst layer without compromising the electrochemical activity of the catalyst layer or impacting on the proton/electron conductivity.

Accordingly, a first aspect of the present invention provides an anode structure for making a proton exchange membrane fuel cell (PEMFC) tolerant to incidences of cell reversal, said anode structure comprising an electrocatalyst layer wherein said electrocatalyst layer comprises at least one electrocatalyst and at least one proton conducting polymer, characterised in that one or more water retaining material(s) are embedded within the electrocatalyst layer.

The term "anode structure" in the context of the present invention means any of the functional components and structures associated with the anode side of the MEA through which hydrogen or methanol fuel is either transported or reacted, i.e. within the gas diffusion substrate and electrocatalyst containing layer on the anode side of the membrane. The practical embodiments of the term anode structure as herein defined include:

(i) An electrocatalyst containing layer bonded to the proton conducting membrane—also referred to as a catalyst coated membrane
(ii) An electrocatalyst containing layer bonded to a gas diffusion substrate material—also referred to as a catalyst coated gas diffusion substrate.

By the term "water retaining material" we mean a material that has an inherent ability to retain water within its structure. Examples of such materials are fibrous materials, nanofibres and particulate materials. The water retaining materials that may be used within a given anode structure may all be the same or a mixture of two or more fibrous materials, nanofibres and/or particles. Preferably the water retaining materials are fibrous materials and/or nanofibres.

The fibrous materials may be selected from the group of carbon fibres commonly supplied as carbon wool or milled fibres (for example type FRC 15 supplied by Le Carbone (Great Britain) Ltd., Portslade, Sussex, UK) or from the group of acid stable, spun, fibrous oxides such as silica, zirconia or titania. A representative example of such materials is the silica wool designated Q fibre, type 106 from Johns Manville Insulation Group, Denver, Colo., USA. Typically these materials contain fibres with an average length of less than 2.0 mm and suitably are of average length less than 1.0 mm, preferably less than 0.5 mm. The fibres suitably have a minimum average length of 50 microns. The diameter of the fibres is typically in the range of 0.1 microns to 20 microns, preferably in the range of 0.4 microns to 10 microns. The fibres may be randomly orientated in the x- and y-directions with some degree of z-directionality. The degree of z-directionality will be influenced by the average fibre length and its relationship with the depth of the electrocatalyst layer when laid down.

A further type of fibrous material that may be selected as a "water retaining material" are those classed as carbon whiskers and fibrils (referred to herein as 'nanofibres') as supplied, for example, by Applied Sciences Inc., 141 West Xenia Avenue, Cedarville, Ohio 45314-0579, USA or Nikkiso Co. Ltd., 43-2 Ebisu 3-chome, Shibuya-ku, Tokyo 150-91, Japan. These nanofibres can be produced down to much lower fibre diameters and fibre lengths and have a different morphology from the materials typically classified as carbon fibres. The nanofibres are typically vapour grown graphitic or semi-graphitic carbon structures (tubular, solid or intermediate in nature) that exist as curved, intertwined entanglements or clusters. The nanofibres are suitably nanotubes, consisting of a series of graphitic sheets wrapped around a hollow core. The diameter of the nanofibres can typically be adjusted from 10 nanometers to 500 nanometers and their length from 1 micron to 100 microns. Typical aspect ratios range from 5 to as high as 1000.

The particulate materials are selected from acid stable, fine powder or colloidal oxides, such as silica, zirconia or titania; or zeolites with a silica to alumina mole ratios greater than 10. Representative examples of such materials include colloidal silica (for example Syton T40AS; DuPont Speciality Chemicals, Antwerp, Belgium), fumed silica (for example Cab-O-Sil M-5; Cabot Ltd. Stanlow, UK), and zeolites (for example Zeolyst CPV 20A; Zeolyst International, Woking, UK). Typically these materials have a primary particle size in the range from 10 nanometers to 1 micron. Preferably the particulate materials are selected from silica, zirconia or titania.

A further aspect of the invention provides an electrocatalyst ink suitable for use in forming the electrocatalyst layer of the anode structure of the invention, said ink comprising a liquid medium, which may be aqueous or organic, one or more electrocatalysts, one or more proton-conducting polymers and one or more water retaining material(s).

The invention also provides a process for preparing the electrocatalyst ink, said process comprising mixing the one or more electrocatalysts with the one or more proton-conducting polymers and the one or more water retaining material(s) in the liquid medium, which may be aqueous or organic.

The term "ink" as used hereinbefore implies a material that is dispersed in a vehicle carrier and that can be applied to a substrate by a variety of methods, such as filtration, vacuum deposition, spray deposition, casting, extrusion, rolling or printing such that the final ink formulation is capable of being used in a high volume production process.

The term "electrocatalyst" will be well understood by a person skilled in the art by meaning a catalyst that when incorporated into a gas diffusion electrode facilitates an electrochemical reaction, for example the catalyst may be selected from (i) the platinum groups metals (i.e. platinum, palladium, rhodium, ruthenium, iridium and osmium),
(ii) gold or silver or
(iii) a base metal or base metal oxide, or an alloy or mixture comprising one or more of these metals, preferably supported on a conductive substrate, such as carbon.

The proton conducting polymers suitable for use may include, but are not limited to:

1) Polymers which have structures with a substantially fluorinated carbon chain optionally having attached to it side chains that are substantially fluorinated. These polymers contain sulphonic acid groups or derivatives of sulphonic acid groups, carboxylic acid groups or derivatives of carboxylic acid groups, phosphonic acid groups or derivatives of phosphonic acid groups, phosphoric acid groups or derivatives of phosphoric acid groups and/or mixtures of these groups. Perfluorinated polymers include Nafion®, Flemion® and Aciplex® commercially available from E. I. DuPont de Nemours (U.S. Pat. Nos. 3,282,875; 4,329,435; 4,330,654; 4,358,545; 4,417,969; 4,610,762; 4,433,082 and 5,094,995), Asahi Glass KK and Asahi Chemical Industry respectively. Other polymers include those covered in U.S. Pat. No. 5,595,676 (Imperial Chemical Industries plc) and U.S. Pat. No. 4,940,525 (Dow Chemical Co.)

2) Perfluorinated or partially fluorinated polymers containing aromatic rings such as those described in WO 95/08581, WO 95/08581 and WO 97/25369 (Ballard Power Systems)

which have been functionalised with $SO_3H$, $PO_2H_2$, $PO_3H_2$, $CH_2PO_3H_2$, COOH, $OSO_3H$, $OPO_2H_2$, $OPO_3H_2$. Also included are radiation or chemically grafted perfluorinated polymers, in which a perfluorinated carbon chain, for example, PTFE, fluorinated ethylene-propylene (FEP), tetrafluoroethylene-ethylene (ETFE) copolymers, tetrafluoroethylene-perfluoroalkoxy (PFA) copolymers, poly (vinyl fluoride) (PVF) and poly (vinylidene fluoride) (PVDF) is activated by radiation or chemical initiation in the presence of a monomer, such as styrene, which can be functionalised to contain an ion exchange group.

3) Fluorinated polymers such as those disclosed in EP 0 331 321 and EP 0345 964 (Imperial Chemical Industries plc) containing a polymeric chain with pendant saturated cyclic groups and at least one ion exchange group which is linked to the polymeric chain through the cyclic group.

4) Aromatic polymers such as those disclosed in EP 0 574 791 and U.S. Pat. No. 5,438,082 (Hoechst AG) for example sulphonated polyaryletherketone. Also aromatic polymers such as polyether sulphones which can be chemically grafted with a polymer with ion exchange functionality such as those disclosed in WO 94/16002 (Allied Signal Inc.).

5) Nonfluorinated polymers include those disclosed in U.S. Pat. No. 5,468,574 (Dais Corporation) for example hydrocarbons such as styrene-(ethylene-butylene)-styrene, styrene-(ethylene-propylene)-styrene and acrylonitrile-butadiene-styrene co- and terpolymers where the styrene components are functionalised with sulphonate, phosphoric and/or phosphonic groups.

6) Nitrogen containing polymers including those disclosed in U.S. Pat. No. 5,599,639 (Hoechst Celanese Corporation), for example, polybenzimidazole alkyl sulphonic acid and polybenzimidazole alkyl or aryl phosphonate.

7) Any of the above polymers which have the ion exchange group replaced with a sulphonyl chloride ($SO_2Cl$) or sulphonyl fluoride ($SO_2F$) group rendering the polymers melt processable. The sulphonyl fluoride polymers may form part of the precursors to the ion exchange membrane or may be arrived at by subsequent modification of the ion exchange membrane. The sulphonyl halide moieties can be converted to a sulphonic acid using conventional techniques such as, for example, hydrolysis.

The present invention also provides a process for preparing an anode structure of the present invention, said process comprising applying the electrocatalyst ink to a substrate, for example a gas diffusion substrate or a solid polymer electrolyte membrane, by any method known in the art and including filtration, vacuum deposition, spray deposition, casting, extrusion, rolling, printing or decal transfer.

A further aspect of the invention provides an MEA which comprises an anode structure according to the present invention. A still further aspect provides a PEM fuel cell comprising an anode structure of the present invention. A yet further aspect provides a PEM fuel cell comprising an MEA according to the present invention.

It will be appreciated that many variations can be made to the invention herein described without departing from the present inventive concept.

The invention claimed is:

1. An anode structure for making a proton exchange membrane fuel cell (PEMFC) tolerant to incidences of cell reversal, said anode structure comprising an electrocatalyst layer wherein said electrocatalyst layer comprises at least one electrocatalyst, at least one proton conducting polymer, and carbon nanofibres, and wherein the at least one electrocatalyst is supported on macroscopic conductive carbon particles.

2. An anode structure according to claim 1, wherein the nanofibres have a diameter in the range of 10 nanometers to 100 nanometers.

3. An anode structure according to claim 2, wherein the nanofibres have an average length of 1 micron to 100 microns.

4. An anode structure according to claim 3, wherein the nanofibres have an aspect ratio in the range of from 5 to 1000.

5. A membrane electrode assembly comprising an anode structure according to claim 1.

6. A proton exchange membrane fuel cell comprising an anode structure according to claim 1.

7. A proton exchange membrane fuel cell comprising a membrane electrode assembly according to claim 5.

8. An anode structure according to claim 1, wherein the nanofibres are nanotubes.

9. An anode structure according to claim 8, wherein the nanotubes consist of a series of graphitic sheets wrapped around a hollow core.

* * * * *